Aug. 23, 1927.
J. F. O'CONNOR
1,640,212
FRICTION SHOCK ABSORBING MECHANISM
Filed Sept. 4, 1925    2 Sheets-Sheet 2
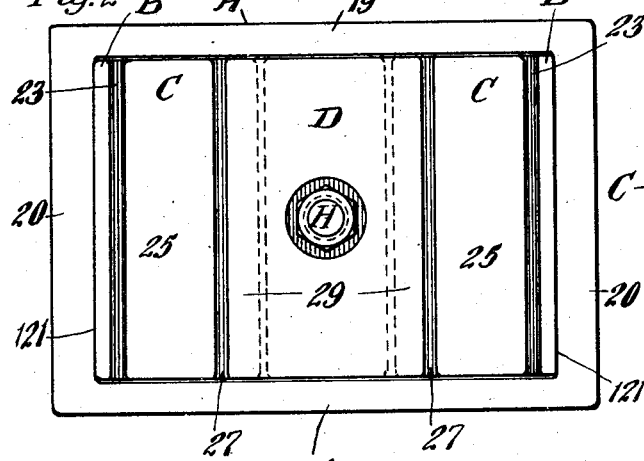
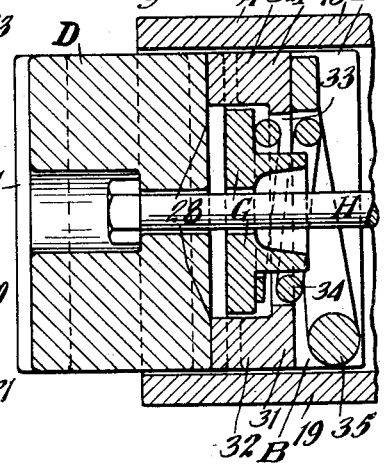
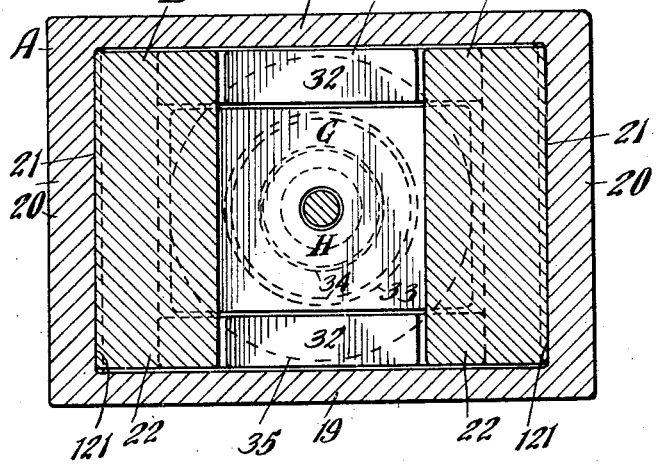
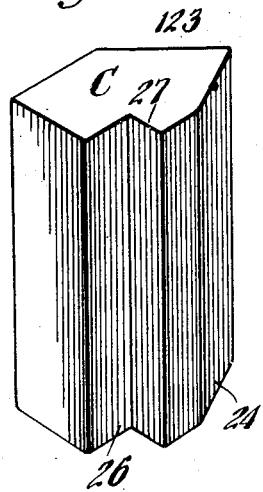
Witness
Wm. Geiger
Inventor
John F. O'Connor
By George I. Haight
His Atty.

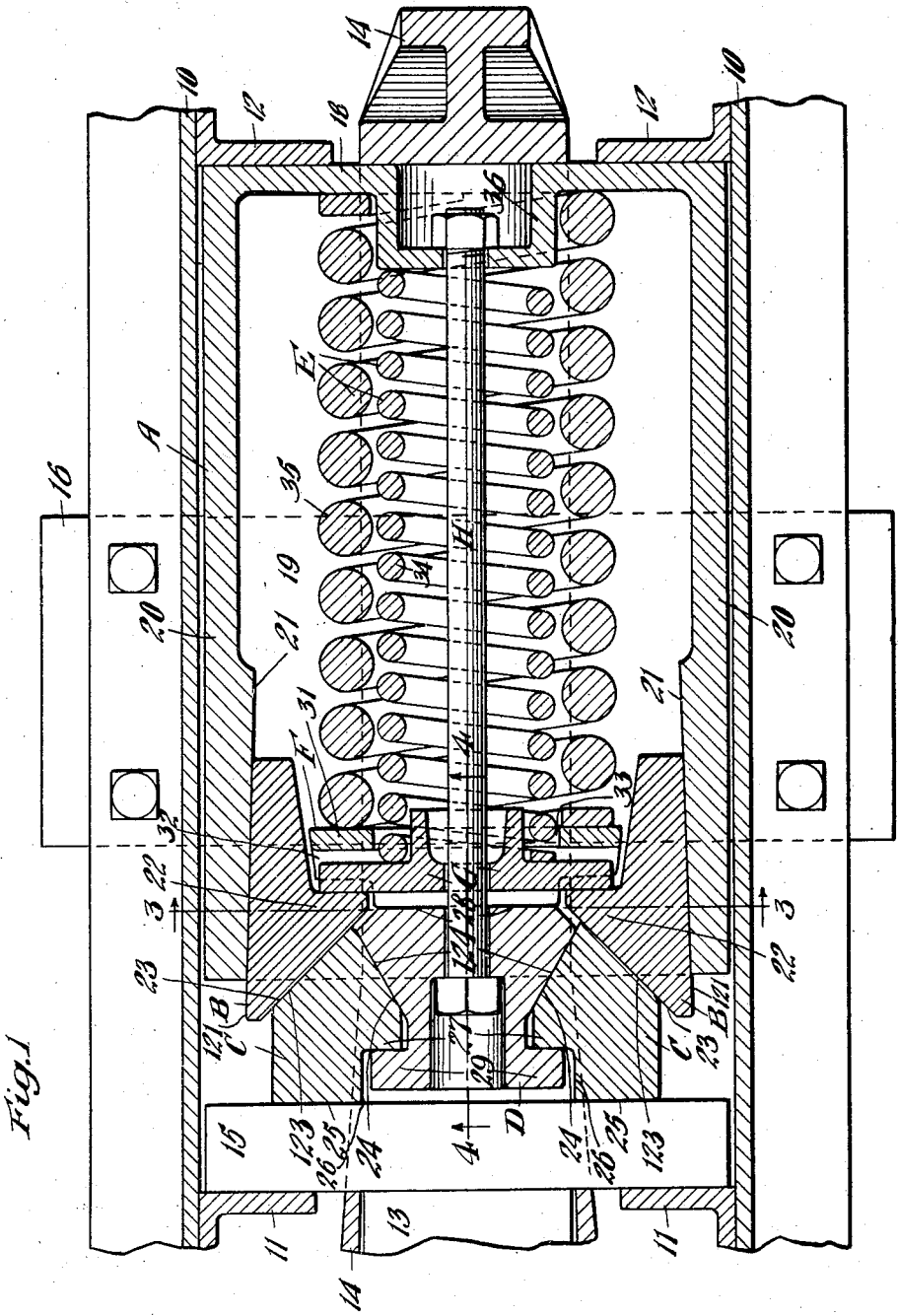

Patented Aug. 23, 1927.

1,640,212

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed September 4, 1925. Serial No. 54,416.

This invention relates to improvements in friction shock absorbing mechanisms.

One object of the invention is to provide a high capacity friction shock absorbing mechanism including friction elements and co-operating wedge means, wherein easy and certain release of the wedge means is assured.

Another object of the invention is to provide a friction shock absorbing mechanism, especially adapted for railway draft riggings, having a wedging system, wherein blunt angle wedge faces are used to assure release, and wherein also the elements of the wedging system are so associated and operated that any tendency toward excessive pressure of the wedge system in relation to the co-operating friction means which may otherwise result in damage to the latter is compensated for by the action of the blunt angle wedging faces.

Still another object of the invention is to provide a mechanism of the character indicated, including a plurality of wedging and friction elements, some of which have co-operating keen wedge faces, wherein a relatively heavy spring means is provided resisting movement of the keen wedge elements independently of the friction elements, whereby release of the keen wedge means is assured independently of the friction elements.

Other objects and advantages of the invention will more fully and clearly appear from the description and claims hereinafter following.

In the drawings forming a part of this specification, Figure 1 is a horizontal, longitudinal, sectional view of a railway draft rigging, showing my improvements in connection therewith. Figure 2 is a front end elevational view of the shock absorbing mechanism proper. Figure 3 is a vertical, transverse, sectional view corresponding substantially to the line 3—3 of Figure 1. Figure 4 is a longitudinal, vertical, sectional view of the front end of the mechanism corresponding substantially to the line 4—4 of Figure 1. And Figure 5 is a detailed, perspective view of an outer wedge element used in connection with my improved mechanism.

In said drawings, 10—10 indicate channel-shaped center or draft sills of a railway car underframe to the inner faces of which are secured front stop lugs 11—11 and rear stop lugs 12—12. The inner end of the drawbar is indicated by 13, to which is operatively connected a hooded yoke 14 within which is disposed a front main follower 15 and the shock absorbing mechanism proper, hereinafter more fully described. The yoke and the parts therewithin are supported in operative position by a detachable saddle plate 16.

The improved shock absorbing mechanism proper, as shown, comprises broadly, a combined friction shell and spring cage A; a pair of friction-shoes B—B; a pair of outer wedge blocks C—C; an inner wedge block D; a main spring resistance E; two spring followers F and G; and a retainer bolt H.

The combined friction shell and spring cage A is in the form of a substantially rectangular box-like casting having a transverse rear end wall 18, spaced, horizontally disposed top and bottom walls 19—19 and spaced, vertical side walls 20—20. The end wall 18 co-operates with the stop lugs 12 in the manner of the usual rear follower. The rear end of the casting A forms the spring cage proper and the friction shell is formed forwardly thereof. The friction shell is provided with opposed, inwardly converging friction surfaces 21—21 at the opposite sides thereof.

The friction shoes B are two in number and are disposed at opposite sides of the mechanism. The shoes B are of like construction, each having a flat outer friction surface 121 adapted to co-operate with the corresponding friction surface 21 of the friction shell. On the inner side, each shoe is provided with a lateral enlargement 22 having an inner wedge face 23 at the forward end thereof. The wedge faces 23 are preferably disposed at a relatively blunt angle with reference to the longitudinal axis of the mechanism. The inner end of the enlargement of each friction shoe provides an abutment for the spring follower G which bears directly thereon.

The outer wedge blocks C correspond in number to the friction shoes and are disposed at opposite sides of the mechanism. The wedge blocks C are of like construction, each having a pair of wedge faces 123 and 24 at the inner end thereof, converging rearwardly of the mechanism. The outer wedge face 123 of each block C co-operates with the wedge face 23 of the corresponding shoe and is correspondingly inclined thereto. The inner wedge face 24 of each block is disposed at a relatively keener angle to the longitudinal axis of the mechanism than the face 23 thereof and co-operates with the inner wedge block D. At the outer end, each wedge block C has a flat face 25 bearing directly on the inner side of the front follower 15. Forwardly of the wedge face 24 each block C is cut away on the inner side thereof as indicated at 26 to provide a transverse shoulder 27 for a purpose hereinafter described.

The inner wedge D is in the form of a cast block having rearwardly diverging wedge faces 124—124 on the opposite sides thereof, each wedge face 124 being correspondingly inclined to and adapted to co-operate with the wedge face 24 of the wedge block C at the same side of the mechanism. At the inner end, the wedge block D has a flat transverse face 28 adapted to co-operate with the spring follower F. At the front end, the block D is laterally enlarged at opposite sides to provide flanges 29—29 adapted to co-operate with the shoulders 27 of the shoes C. As most clearly shown in Figure 1, the front end of the wedge block D is normally spaced from the inner face of the front follower 15.

The spring follower G is in the form of a substantially rectangular plate having a central boss rearwardly extending therefrom and projecting into the inner coil of the spring resistance E. The spring follower F comprises a plate like main body portion 31 having forwardly projecting flanges 32—32 at the top and bottom thereof, the flanges overhanging the follower plate G and normally projecting forwardly beyond the same and bearing directly on the transverse flat end face 28 of the wedge block D. The main body portion of the follower F is provided with a central opening 33 adapted to freely accommodate the inner coil of the main spring resistance E, as most clearly shown in Figures 1 and 4. In the normal position of the parts, the spring follower F is spaced a sufficient distance rearwardly of the spring follower G to allow differential movement of the friction shoes B without the spring followers coming into actual contact.

The main spring resistance E comprises a relatively light inner coil 34 and a relatively heavier outer coil 35. The inner coil 34 bears at its front end directly on the follower G and has the rear end thereof bearing on a hollow boss 36 projecting inwardly from the end wall 18 of the friction shell A. The outer coil 35 of the spring resistance has its opposite ends bearing respectively on the spring follower F and the end wall 18 of the casting A and is held in centered position by the boss 36.

The parts are held in assembled relation and under initial compression by the retainer bolt H extending through the inner spring 34, and alined recesses in the spring follower G and wedge block D, having one end thereof anchored to the end wall 18 of the casting A by means of the usual nut and having the other end thereof anchored to the wedge D by means of the head thereof, the wedge block D being recesses to slidingly accommodate the head of the bolt. The nut is slidingly accommodated within the hollow boss 36.

The operation of my improved shock absorbing mechanism is as follows, assuming a compression stroke: The wedge blocks C will be forced inwardly toward the casting A, setting up a wedging action between the wedge D and the blocks C, there being substantially no relative movement between the relatively blunt wedge faces 23 and 123 of the block C and the shoes B. During this time, the relatively heavy outer spring 35 will be compressed. As the compression of the mechanism is continued, the wedge friction shoes B will be moved inwardly of the shell along the inwardly converging surfaces 21 thereof, thereby effecting lateral movement toward the axis of the gear of the friction shoes on the wedge blocks C. During the inward movement of the shoes with reference to the friction shell, the relatively light spring 34 will also be compressed. While the mechanism is being compressed, the friction shell will be expanded slightly by the wedge action, thereby setting up a lateral tension therein. It will be evident that any tendency toward excessive expansive action of the wedge system with relation to the shell is compensated for by the inward movement of the shoes with reference to the blocks C, the shoes being resisted by the relatively light spring 34. The danger of bursting of the friction shell by excessive wedging pressure is thus completely avoided. The compression of the mechanism will continue either until the actuating force is reduced, or the front follower comes into engagement with the casting A, whereupon there will be no further compression of the springs 34 and 35.

Upon removal of the actuating pressure, the spring resistance elements will act to restore all the parts to normal position, the spring 35 acting independently of the spring 34 to force the wedge blocks D outwardly. It will be evident that due to the bluntness of the wedge faces 23 and 123 and the inward pressure exerted on the shoes B by the contraction of the shell, an easy release of the mechanism is effected. It will also be evident that even if the friction shoes are retarded in the least, the relatively heavy spring 35 will first act to project the wedge D outwardly and then due to the spring follower F coming into engagement with the spring follower G, add the force of the spring 35 to the spring 34 to effect release of the shoes.

While I have herein shown and described what I now consider the preferred manner of carrying out my invention, the same is merely illustrative, and I contemplate all changes and modifications that come within the scope of the claims appended hereto.

I claim:

1. In a friction shock absorbing mechanism, the combination with a friction shell having interior friction surfaces; of a main spring resistance including an inner and a relatively heavy outer coil; and a friction generating wedge system co-operating with a shell, said system including friction elements slidable on the shell friction surfaces and wedge means co-operating with said elements, said friction elements having their movement resisted by the inner coil of the spring resistance and movement of said wedge means being resisted independently of said friction elements by the heavier outer coil of the spring resistance.

2. In a friction shock absorbing mechanism, the combination with a friction shell having interior friction surfaces; of resistance means including a light spring and a relatively heavier spring; and a friction generating wedge system co-operating with the shell, said system including friction elements slidable on the friction surfaces of the shell and wedge means co-operating with said friction elements, said friction elements having their movement resisted by the light spring and movement of said wedge means being resisted independently of said friction elements by the heavier spring.

3. In a friction shock absorbing mechanism, the combination with a friction shell having inwardly converging friction surfaces on the interior thereof; of a plurality of friction wedge shoes slidable on said shell friction surfaces, each shoe having a wedge face extending at a relatively blunt wedging angle with reference to the longitudinal axis of the mechanism; a main spring resistance including a relatively light coil and a heavier coil; outer wedge members having a set of wedge faces extending at a relatively keen wedging angle with reference to said longitudinal axis; and a second set of wedge faces extending at a relatively blunt angle with respect to said axis, said second named set of wedge faces being adapted to co-act with the wedge faces of said shoes; and an inner wedge provided with a set of wedge faces extending at relatively keen angles with respect to said axis and adapted to co-act with the keen angle wedge faces of said outer wedges, said inner wedges being interposed between the outer wedges and the heavier coil of the main spring resistance and resisted by the latter independently of said light coil.

4. In a friction shock absorbing mechanism, the combination with a friction shell having inwardly converging friction surfaces on the interior thereof; of a plurality of friction wedge shoes slidable on said shell friction surfaces, each shoe having a wedge face extending at a relatively blunt wedging angle with reference to the longitudinal axis of the mechanism; a main spring resistance including inner and outer coils, said inner coil co-operating directly with the friction shoes; outer wedge members having a set of wedge faces extending at a relatively keen wedging angle with reference to said longitudinal axis; and a second set of wedge faces extending at a relatively blunt angle with respect to said axis, said second named set of wedge faces being adapted to co-act with the wedge faces of said shoes; and an inner wedge provided with a set of wedge faces extending at relatively keen angles with respect to said axis and adapted to co-act with the keen angle wedge faces of said outer wedges, said inner wedge being interposed between the outer wedges and the outer coil of the main spring resistance.

5. In a friction shock absorbing mechanism, the combination with a cylindrical friction shell having inwardly converging cylindrical friction surfaces on the interior thereof; of a plurality of friction wedge shoes slidable on said shell friction surfaces, each shoe having a wedge face on the inner side thereof; a main spring resistance including a light coil and a relatively heavier coil, said light coil resisting movement of the shoes; a wedge pressure transmitting means, including a plurality of wedge elements, each of said elements being provided with a pair of wedge faces, one face of each pair co-acting with the wedge face of one of said shoes; and an inner central wedge provided with a plurality of wedge faces adapted to co-act with the remaining wedge faces of each pair of wedge faces on said elements, said inner wedge being interposed between the wedge pressure transmitting means and the heavier coil of the spring resistance, said last named coil resisting movement of the wedge independently of the shoes.

In witness that I claim the foregoing I have hereunto subscribed my name this 27th day of August, 1925.

JOHN F. O'CONNOR.